(12) United States Patent
Lindecke (10) Patent No.: US 11,994,344 B2
(45) Date of Patent: May 28, 2024

(54) INSTALLATION FOR RECYCLING CONTAMINATED METAL SCRAP

(71) Applicant: ABP Induction Systems GmbH, Dortmund (DE)

(72) Inventor: Christian Lindecke, Dortmund (DE)

(73) Assignee: ABP Induction Systems GmbH, Dortmund (DE)

( * ) Notice: Subject to any disclaimer, the term of this patent is extended or adjusted under 35 U.S.C. 154(b) by 150 days.

(21) Appl. No.: 17/407,362

(22) Filed: Aug. 20, 2021

(65) Prior Publication Data

US 2022/0057141 A1 Feb. 24, 2022

(30) Foreign Application Priority Data

Aug. 20, 2020 (EP) ..................................... 20000300

(51) Int. Cl.
*F27D 17/00* (2006.01)
*F27B 14/02* (2006.01)
*F27D 3/00* (2006.01)

(52) U.S. Cl.
CPC ............ *F27D 17/001* (2013.01); *F27B 14/02* (2013.01); *F27D 2003/0062* (2013.01); *F27M 2001/10* (2013.01)

(58) Field of Classification Search
CPC .. F27B 14/02; F27B 14/04; F27D 2003/0062; F27D 17/001
See application file for complete search history.

(56) References Cited

U.S. PATENT DOCUMENTS

| | | | | |
|---|---|---|---|---|
| 2,047,473 A | * | 7/1936 | Howat | C21B 3/10 105/272 |
| 3,291,596 A | * | 12/1966 | Verge | C21C 7/10 75/378 |
| 3,415,179 A | * | 12/1968 | Scheel | F27D 17/003 266/158 |
| 3,604,376 A | * | 9/1971 | Meyer | F27D 9/00 110/184 |

(Continued)

FOREIGN PATENT DOCUMENTS

| | | | | |
|---|---|---|---|---|
| CN | 1376208 A | * | 10/2002 | ............. C21C 5/527 |
| CN | 110 873 530 A | | 3/2020 | |

(Continued)

OTHER PUBLICATIONS

EP 20 000 300.2, Filed Aug. 20, 2020, European Search Report, dated Jan. 22, 2021 (8 pages).

(Continued)

*Primary Examiner* — Scott R Kastler
(74) *Attorney, Agent, or Firm* — Barclay Damon LLP (57) ABSTRACT

An installation for recycling contaminated scrap metal includes a furnace frame and a melting furnace arranged within the furnace frame and configured to tilt, and a hood-like housing. The melting furnace includes an upper melting furnace opening and a casting device configured to cast a metal melt produced in the melting furnace into a pan. The hood-like housing is positioned on a top of the melting furnace and surrounds and covers the upper melting furnace opening. The hood-like housing includes at least one door, and a flue gas removal system coupled to the hood-like housing in a gas-tight manner and configured to tilt along with the melting furnace.

15 Claims, 6 Drawing Sheets

(56) References Cited

U.S. PATENT DOCUMENTS

| | | | | | |
|---|---|---|---|---|---|
| 3,609,236 | A | * | 9/1971 | Heilman | F27D 21/02 |
| | | | | | 348/83 |
| 3,999,001 | A | * | 12/1976 | Overmyer | F27D 3/18 |
| | | | | | 373/9 |
| 2008/0219830 | A1 | * | 9/2008 | Wells | B64D 9/00 |
| | | | | | 410/52 |

FOREIGN PATENT DOCUMENTS

| | | | |
|---|---|---|---|
| DE | 12 01 954 C2 | | 9/1965 |
| DE | 3526433 C1 | * | 11/1989 |
| DE | 10 2010 034571 A1 | | 2/2012 |
| JP | H07 180971 A | | 7/1995 |
| KR | 200382735 Y1 | * | 4/2005 ............... C21C 5/52 |
| WO | 2014/071846 A1 | | 5/2014 |

OTHER PUBLICATIONS

EP 20 000 300.2, Filed Aug. 20, 2020, European Examination Report, dated Nov. 15, 2021 (5 pages).

\* cited by examiner

FIG.7

INSTALLATION FOR RECYCLING CONTAMINATED METAL SCRAP

CROSS REFERENCE TO RELATED INVENTION

This application is based upon and claims priority to, under relevant sections of 35 U.S.C. § 119, European Patent Application No. 20 000 300.2, filed Aug. 20, 2020, the entire contents of which are hereby incorporated by reference.

FIELD OF TECHNOLOGY

The present disclosure relates to an installation for recycling contaminated scrap metal, and specifically for recycling asbestos-containing scrap metal.

BACKGROUND

EP 3 089 829 B1 discloses a method for recycling asbestos-containing steel scrap. Here, the steel scrap is transported in an air-tight container to an installation with which applicable melting steps can be performed. In this case, the steel scrap is completely submerged in a melt of molten steel, wherein the asbestos is converted into non-crystalline material which dissolves in the steel and/or accumulates in the slag. After the molten steel cools, a homogeneous steel scrap product is formed that is substantially free of asbestos. The corresponding steps are performed in a space that is sealed off from the surroundings in a manner that is substantially gas-tight, which is generated by maintaining a subatmospheric pressure in the space.

An embodiment of the disclosed installation for recycling asbestos-containing steel scrap operates more safely and effectively. In an embodiment, the method described above should be able to be performed with the disclosed installation.

In an embodiment, the installation has an apparatus for guiding the contaminated scrap metal parallel to the tilt axis of the melting furnace. On the other hand, an apparatus for guiding the contaminated scrap metal perpendicular to the tilt axis of the melting furnace can also be provided. The housing can in this case comprise a single door or additionally a second door. When arranging the two doors, one door preferably serves to introduce the contaminated scrap metal into the melting furnace, while the second door serves to remove the slag formed on the melt. However, just one single door can also be provided that serves to introduce the contaminated scrap metal into the melting furnace and also to remove the slag formed on the melt. Generally, however, a second door can also serve only for performing necessary work, such as checking the furnace space, removing a sample, and measuring the temperature of the melt.

When performing the associated recycling method, what matters is preventing contamination of the surroundings with, for example, asbestos particles. Therefore, it must be ensured that no particles can enter the surrounding atmosphere either when feeding the scrap metal to the melting furnace or during the melting process. The disclosed installation achieves this by the arrangement of a hood-like housing above the actual melting furnace, into which the scrap metal to be processed is introduced and from there brought into the melting furnace, and from which the flue gases that are formed during the melting process are removed. Along with the melting furnace, the hood-like housing is arranged tiltably or otherwise configured to tilt and has at least one door. In an embodiment, the hood-like housing has at least two doors, wherein the asbestos-containing steel scrap is introduced through the first door and the slag formed on the melt is removed through the second door. The flue gases that are formed during the melting process are removed via a channel-like flue gas removal system.

The hood-like housing is configured in particular for a continuous interior temperature of approximately 1,200° C. and has an apparatus for temperature adjustment in order to also break down the asbestos fibers released during the charging process. The interior is especially partitioned off from the surroundings in the tightest manner possible, so that nearly gas-tight conditions result. As a result, work can be performed in the installation with negative pressure. This minimizes the amount of ambient air penetrating into the interior, which would lower the interior temperature.

In an embodiment, the installation is provided with apparatuses with which the melting furnace with the hood-like housing can be tilted backwards (i.e., against the direction for pouring) for deslagging. Corresponding apparatuses ensure that the furnace with the hood-like housing is tilted in the opposite direction for pouring. This ensures that the flue gas removal system proceeding from the hood-like housing follows the corresponding tilting movements of the melting furnace so that an uninterrupted connection exists between the hood-like housing and the flue gas removal system.

In an embodiment, the channel-like flue gas removal system has a gas discharge channel which is fastened to the top of the melting furnace and is connected in an articulated manner to an end channel leading to the floor of the installation and to an intermediate channel leading to the hood-like housing. This gas discharge channel fastened to the top of the melting furnace therefore takes part in the tiling movements of the top of the melting furnace to perform tapping and to remove the slag, while the articulated connection to the end channel ensures that the one end of the channel is moved along accordingly in an articulated manner while its other end is fixed. This fixed end is preferably arranged pivotably in a suitable frame.

In another embodiment, the gas discharge channel and the end channel are not connected mechanically, but rather the end channel is equipped with its own, preferably hydraulically actuated, drive in order to be able to always follow the movement of the gas discharge channel so that the flue gas openings of both channels always overlap, such that the flue gas flow is not interrupted. The respective positions of the gas discharge channel and the end channel are detected by sensors. An electronic control loop, which acts on the aforementioned drive, causes the end channel to always follow the movement of the gas discharge channel.

In an embodiment, the gas discharge channel and the end channel are not connected to each other in an articulated manner. Otherwise, the weight forces of the end channel would influence the weight indicator of the furnace, which stands on weighing cells. However, an articulated connection is conceivable if the furnace does not have weighing cells and the aforementioned influence therefore cannot take place.

In an embodiment, the intermediate channel proceeding from the hood-like housing opens into the upper end region of the gas discharge channel fastened to the top, on the lower end region of which channel the end channel is mounted in an articulated manner. Furthermore, the installation preferably has an apparatus for receiving a casting mold into which a tapping runner of the melting furnace opens. During the casting process, the melting furnace arranged in the furnace frame is tilted so that the tapping runner extends to the opening of the casting mold which is supported by this apparatus.

In an embodiment, the installation has an apparatus for applying negative pressure to the hood-like housing and the flue gas removal system. The method performed with the installation, i.e., introducing the asbestos-containing steel scrap, submerging the scrap in an existing melt bath, melting the scrap, removing the slag, performing tapping, discharging the flue gas, therefore preferably takes place under negative pressure to prevent asbestos-containing particles from escaping into the surrounding atmosphere. It is therefore understood that the entire installation is designed gas-tight and all components are insulated accordingly to withstand temperatures in the range of approximately 1,200° C. Since the charging process and the melting process can no longer be observed due to the partitioned-off construction, at least one camera is preferably provided for interior observation. This relates both to the actual melting furnace and the hood-like housing.

The hood-like housing is expediently fastened to the top of the melting furnace via a quickly detachable connection. In this way, a crucible, for example, of the melting furnace can be swiftly replaced without costly disassembly work being necessary. In this case, the intermediate pipe is preferably detached from the hood-like housing and the housing is removed, after which the crucible can be replaced.

As already explained, an embodiment of the hood-like housing has two doors for introducing the asbestos-containing scrap and for removing the slag and working on the furnace. In another embodiment, the hood-like housing is provided with a docking apparatus for a charging machine on the door for introducing the contaminated scrap. This door has, for example, a closure element that can be moved up and down and is movable via suitable chain drives. While the door is being opened (upward movement of the closure element), the charging machine moves to the docking apparatus and conveys the asbestos-containing scrap into the hood-like housing and from above into the melting furnace. This ensures gas-tightness during filling of the furnace. Both doors are insulated accordingly.

In an embodiment, the flue gas removal system comprises in particular an appropriately designed pipe system, the pipes of which are preferably composed of individual segments, wherein these segments are, for example, screwed together in a gas-tight manner. Thus, for example, the intermediate channel can comprise a pipe consisting of three segments, as can the gas removal channel, while the end channel, or respectively lower channel, preferably has four segments, the end segments of which are provided with the articulated connection in this case, the end channel preferably has a lateral gas outlet opening in the lower end segment arranged on the floor. The corresponding flue gas can be led through this opening to a suitable gas processing installation.

As already explained, for example the contaminated scrap metal can be guided parallel to the tilt axis of the melting furnace or perpendicular to it. In the case of a feed parallel to the tilt axis, preferably both of the mentioned two doors are used, of which one serves to introduce the contaminated scrap metal into the melting furnace and the other to remove the slag formed from the melt. When guiding the contaminated scrap metal perpendicularly to the tilt axis of the melting furnace, a single door can be used that serves both for introducing the contaminated scrap metal and for removing the slag. These doors can simultaneously also be used for other purposes, for example extracting samples, examinations, etc. . . . However, the invention does not preclude the presence of more than two doors that are used for the purposes mentioned above.

Furthermore, it has also been explained above that the hood-like housing with a flue gas removal system is preferably designed gas-tight. Of course, the word "gas-tight" used here means approximately gas-tight d does no require 100% gas-tightness to be achieved. The invention therefore also comprises less gas-tight embodiments.

In an embodiment, the end channel is preferably, only in a furnace that can tilt backwards, guided to the floor and is thereby mounted with the frame such that the axis for the backwards tilting coincides with the axis formed by the frame. In furnaces that do not tilt backwards, the movable end channel may be unnecessary if it is present, then it is stationary and can also lead horizontally or in the direction of a hall ceiling instead of to the floor.

As explained, an embodiment of the installation preferably has a camera for interior observation of the melting furnace and hood-like housing. Of course, this does not preclude multiple cameras from being provided, in particular also such for exterior observation.

Regarding the quickly detachable connection of the hood-like housing to the top of the melting furnace, the hood-like housing is preferably fastened to the top of the furnace us the ISO twist-lock principle. In addition, a container for receiving slag can preferably be provided.

It is understood that the provided doors preferably have special drives to fulfill their corresponding functions. It is also self-evident that corresponding movement control systems for the channel-like flue gas removal system are provided, for example components of the sequence control, such as displacement sensors, etc. This relates especially to the case in which the as discharge channel and end channel are not connected to each other and in which the end channel has its own, preferably hydraulic, drive with which the end channel can be moved in sync with the movement of the melting furnace.

The cameras are cooled due to heat exposure. The invention also comprises the use of the cameras for temperature measurement. The use of an optical thermal sensor can also be provided. The channel-like flue gas removal system is preferably thermally insulated.

BRIEF DESCRIPTION OF THE DRAWINGS

The invention will be explained in detail below with reference to an exemplary embodiment in conjunction with the drawing. In the figures.

DETAILED DESCRIPTION OF THE INVENTION

Figure 1:
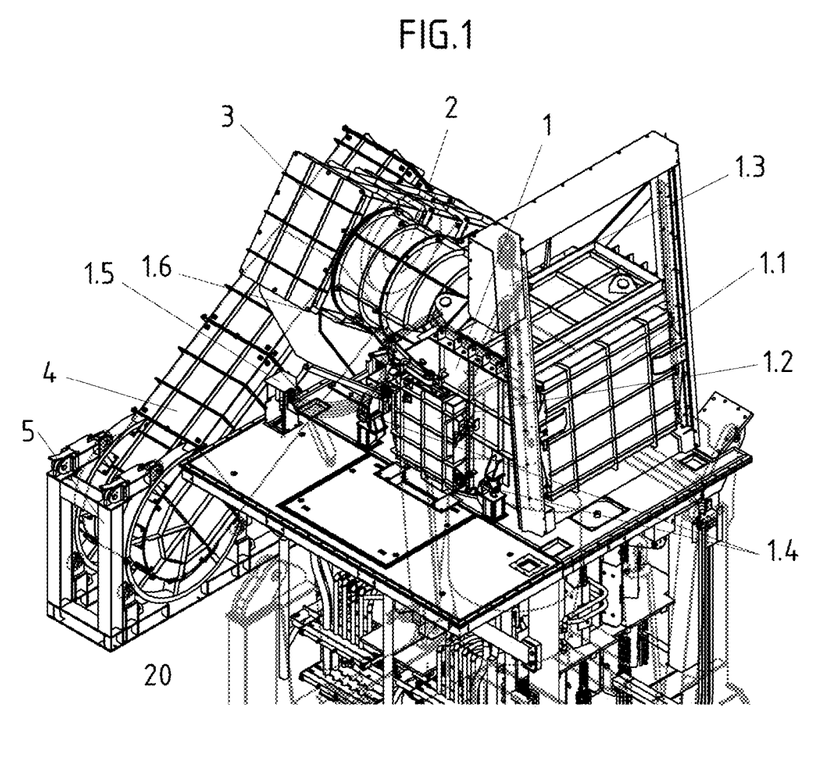
FIG. 1 illustrates a perspective top view of an embodiment of an installation for recycling asbestos-containing steel scrap.
Figure 2:
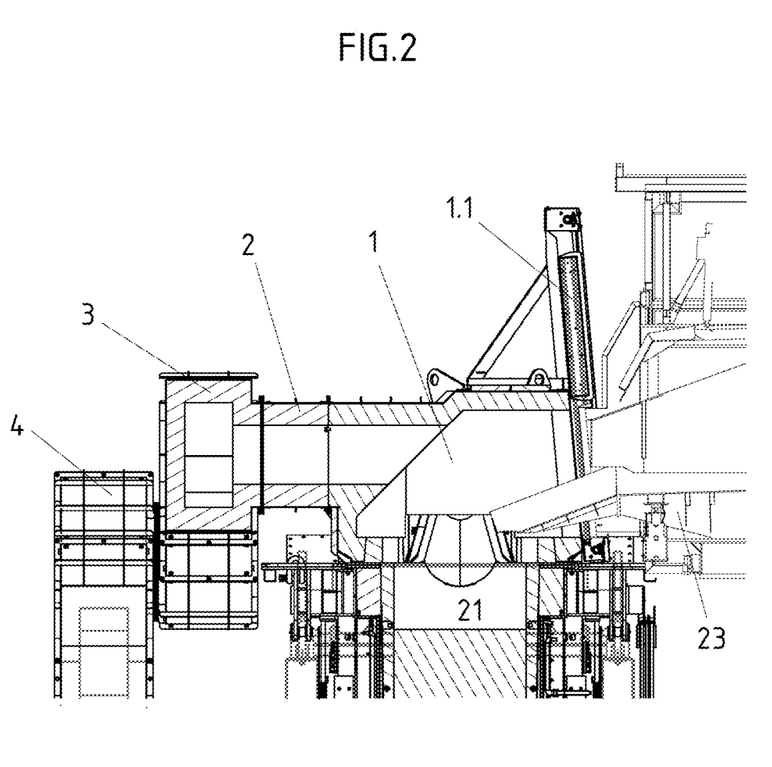
FIG. 2 illustrates a cross-sectional view of the embodiment of a section view the installation from FIG. 1.

As shown in FIGS. 1 and 2, tan installation for recycling asbestos-containing steel scrap has, as main components, a furnace frame 20, a melting furnace 21 mounted tiltably therein, and a hood-like housing 1, known as a doghouse, arranged on the top of the tiltable melting furnace. This hood-like housing 1 surrounds the upper melting furnace opening (not shown here) and covers it. Furthermore, the installation has a flue gas removal system connected to the hood-like housing 1, which will be explained more precisely later.

Asbestos-containing scrap is introduced into the hood-like housing 1 by a suitable charging machine via a charging door 1.1 that can be moved up and down and from there introduced into the melting furnace 21. The relevant method for recycling the asbestos-containing steel scrap is described in detail in the previously mentioned EP 3 089 829 B1. Such a method can be performed with the installation described here.

The embodiment of the hood-like housing 1 shown in FIG. 1 has two doors, namely the previously mentioned loading door 1.1 and a deslagging door 1.2. The loading door 1.1 is moved up and down by a chain drive 1.3 to open and close it. The deslagging door 1.2 is opened and closed manually to deslag the melt or perform a temperature measurement.

The hood-like housing 1 is fastened to the top of the furnace by four quickly detachable connections, e.g., according to the ISO twist-lock principle 1.4. With these connections, the housing can be quickly and easily detached from the top of the furnace to allow repairs or maintenance to be performed accordingly. A high-temperature camera 1.6 is installed on the wall of the housing 1.

The flue gas removal system connected to the hood-like housing 1 is configured so that it follows all the movements of the melting furnace 21, particularly its tilting movements for casting and deslagging. The flue gas removal system has a gas discharge channel 3 that is fastened to the top of the furnace and is connected to an intermediate channel 2, which is connected to the hood-like housing 1. Furthermore, an end channel 4 which is connected in an articulated manner to a frame 5 that is fixed to the floor follows on the gas removal channel 3. In addition, an energy feed column 1.5 is installed on the top of the furnace to supply the hood-like housing 1 with energy.

FIG. 2 shows a sectional representation of an installation for recycling in a leading process. A suitable charging machine 23 introduces asbestos-containing scrap, with the charging door 1.1 open, into the hood-like housing 1 and there through the upper opening of the melting furnace 21. The melting furnace can be a suitable crucible induction furnace. The installation is gas-tight since it is operated with negative pressure to prevent asbestos-containing particles from escaping into the surroundings. A corresponding flue gas removal system ensures that the flue gases that form are discharged to a suitable treatment installation. This system has the intermediate pipe 2 proceeding from the hood-like housing 1 and the gas removal channel 3 firmly attached to the top of the melting furnace, which channel is connected on the flue-gas side to the end channel 4, which is in turn supported in an articulated manner in the frame 5. The flue gas removal system is designed so that it can follow all the movements of the installation.

Figure 3:
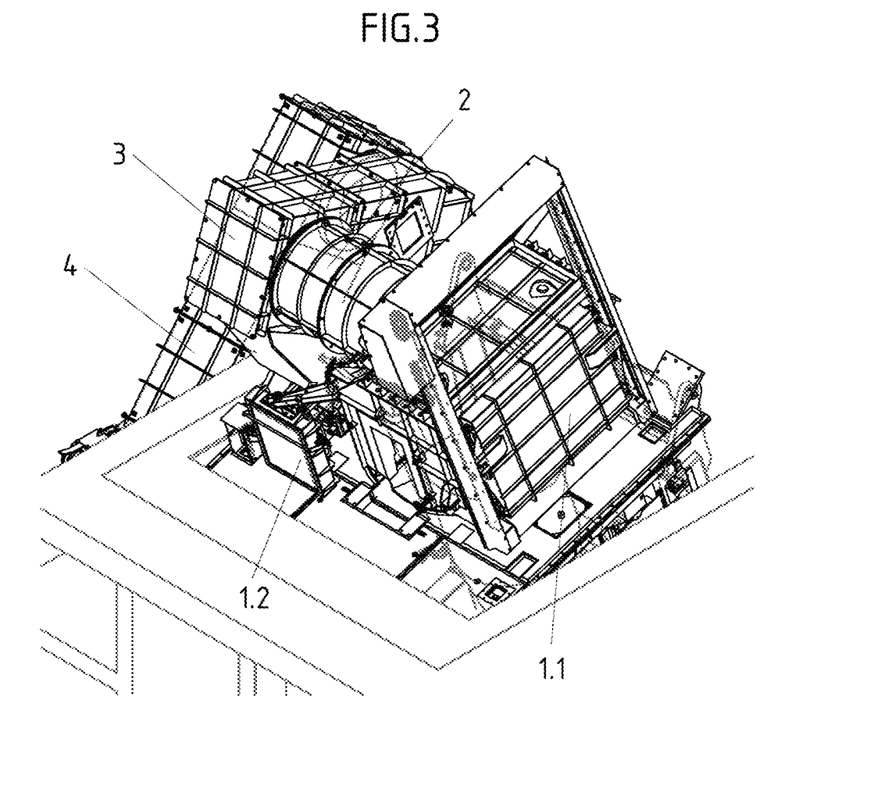
FIG. 3 illustrates a perspective top a view of an embodiment of the installation in the tilted state for deslagging.

FIG. 3 shows a view of the installation in which the melting furnace is tilted for deslagging. The deslagging door 1.2 is open here, while the charging door 1.1 is closed. The corresponding tilting movement is also done by the intermediate channel 2 and by the gas removal channel 3, while the end channel 4 is moved along accordingly, actuated by a hydraulic cylinder.

Figure 4:
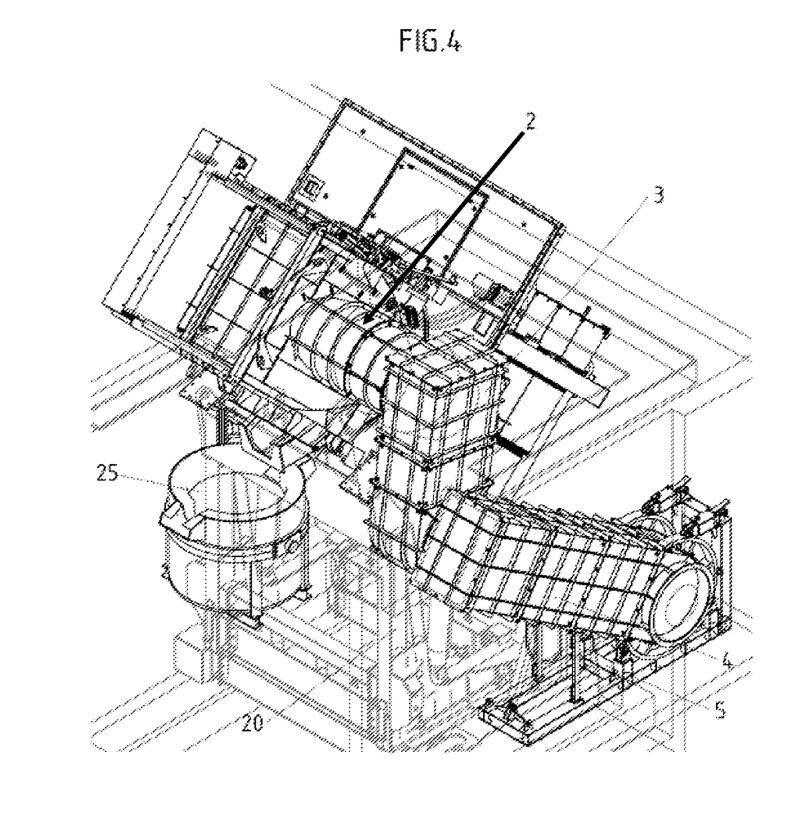
FIG. 4 illustrates a perspective top view of an embodiment of the installation the tilted state for casting.
Figure 5:
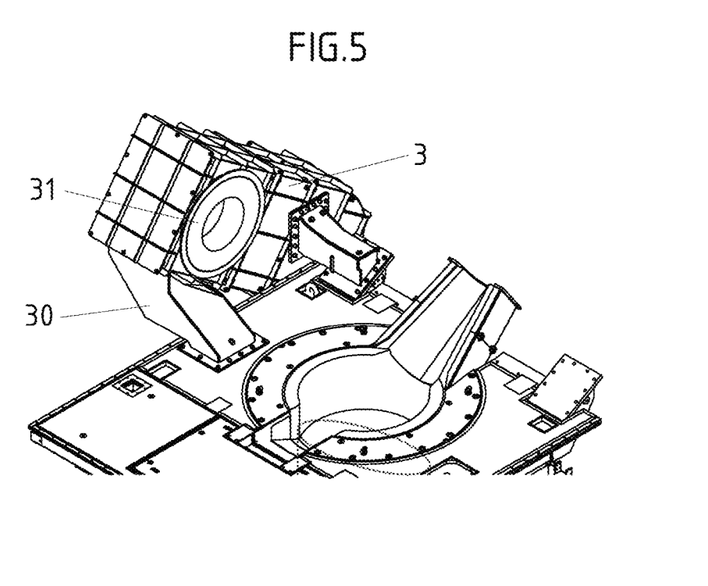
FIG. 5 illustrates a perspective top view of an embodiment of a gas discharge channel attached to the melting furnace of the flue gas removal system of the installation.

FIG. 4 shows the installation in a tilted state opposite to the deslagging, in which the melt is being poured into a pan 25. FIG. 5 shows a view of the gas discharge channel 4, which is fixed to the top of the furnace by a fastening arm 30 and thus takes part in a corresponding tilting movement of the furnace. The connection to the intermediate pipe 2 which leads to the hood-like housing 1 is shown at 31.

Figure 6:
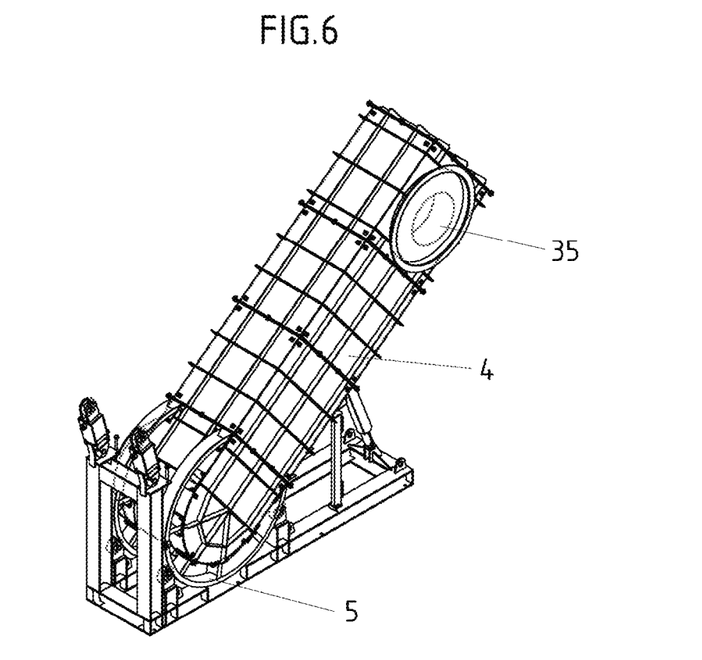
FIG. 6 illustrates a first perspective view of an embodiment of an end channel of the flue gas removal system.
Figure 7:
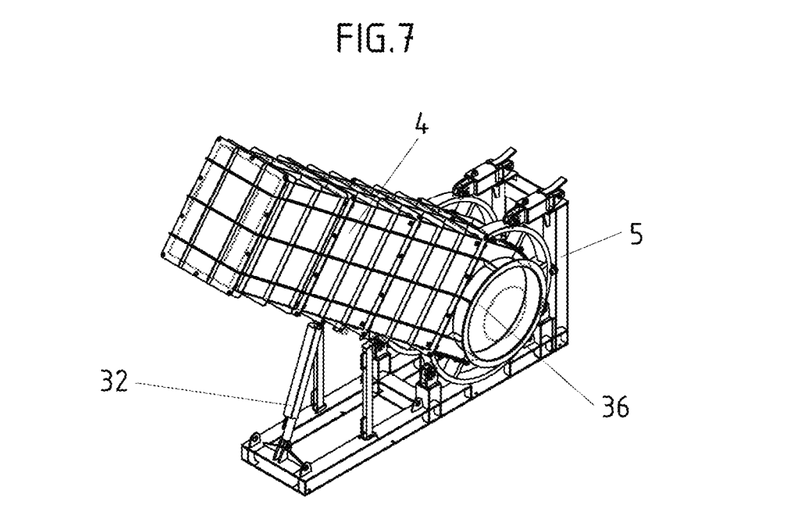
FIG. 7 illustrates a second perspective view of an embodiment of an end channel of the flue gas removal system.

FIGS. 6 and 7 show two views of the end channel 4, which is connected on the flue-gas side to the gas removal channel 3, as shown with the corresponding opening 35, as well as with the frame 5 fixed to the floor. An opening 36 serves to connect a line that leads to a flue gas treatment location. Furthermore, FIG. 7 shows a hydraulic cylinder 32 with which the end channel 4 can be lifted or lowered following the movements of the system.

The invention claimed is:

1. An installation for recycling contaminated scrap metal comprising:
   a furnace frame;
   a melting furnace arranged within the furnace frame and configured to tilt, wherein the melting furnace comprises,
      an upper melting furnace opening, and
      a casting device configured to cast a metal melt produced in the melting furnace into a pan;
   a housing positioned on a top of the melting furnace, wherein the housing surrounds and covers the upper melting furnace opening in an air-tight manner and comprises at least one door; and
   a flue gas removal system coupled to the housing in a gas-tight manner and configured to tilt along with the melting furnace.

2. The installation according to claim 1, further comprising an apparatus configured to guide the contaminated scrap metal parallel to a tilt axis of the melting furnace.

3. The installation according to claim 1, further comprising an apparatus configured to guide the contaminated scrap metal perpendicular to a tilt axis of the melting furnace.

4. The installation according to claim 1, wherein the flue gas removal system comprises a gas discharge channel fastened to the top of the melting furnace, wherein the gas discharge channel is connected to an end channel and to an intermediate channel leading to the housing, and wherein the gas discharge channel is configured to articulate relative to the end channel and the intermediate channel.

5. The installation according to claim 1, wherein the flue gas removal system comprises:
   a gas discharge channel fastened to the top of the melting furnace; and
   an end channel,
   wherein the gas discharge channel and the end channel are not connected to each other, and wherein the end channel comprises a drive configured to move the end channel in sync with the tilt of the melting furnace so that flue gas openings of the gas discharge channel and the end channel always overlap.

6. The installation according to claim 5, wherein the end channel is pivotably mounted in a frame.

7. The installation according to claim 4, wherein when the melting furnace is configured to be tilted backwards, the end channel leads to a floor of the installation and is mounted with the frame such that an axis for the backwards tilting corresponds with an axis formed by the frame.

8. The installation according to claim 7, further comprising a swivel joint positioned between the end channel, the gas discharge channel, and the frame.

9. The installation according to claim 4, wherein the gas discharge channel comprises:
   an upper end region that is fastened to the intermediate channel; and
   a lower end region that is connected to the discharge channel.

10. The installation according to claim 1, further comprising an apparatus configured to receive the pan that is configured to receive the melt, wherein a tapping runner of the melting furnace opens into the pan.

11. The installation according to claim 1, further comprising at least one camera configured to observe an interior of the melting furnace and the housing and further configured to measure a melt temperature.

12. The installation according to claim 1, wherein the housing is fastened to the top of the melting furnace by a quickly detachable connection, wherein the quickly detachable connection comprises an ISO twist-lock.

13. The installation according to claim 1, further comprising a charging machine configured to dock with the housing, wherein the charging machine is configured to introduce the contaminated scrap metal.

14. The installation according to claim 1, wherein the housing with the flue gas removal system is configured to leak gas at a defined gas leakage rate.

15. The installation according to claim 1, further comprising a container configured to receive slag.

* * * * *